(No Model.)

R. BOYD.
PIPE HANGER.

No. 521,149. Patented June 12, 1894.

Witnesses —
Arthur Keithley
C. Johnson

Inventor.
Randolph Boyd.
By I. M. Thurlow,
Atty.

UNITED STATES PATENT OFFICE.

RANDOLPH BOYD, OF GALVA, ILLINOIS.

PIPE-HANGER.

SPECIFICATION forming part of Letters Patent No. 521,149, dated June 12, 1894.

Application filed February 15, 1894. Serial No. 500,216. (No model.)

*To all whom it may concern:*

Be it known that I, RANDOLPH BOYD, a citizen of the United States, residing at Galva, in the county of Henry and State of Illinois, have invented certain new and useful Improvements in Pipe-Hangers; and I do hereby declare the following to be a full, clear, and exact description of the invention, such as will enable others skilled in the art to which it appertains to make and use the same.

This invention relates to improvements in pipe hangers.

The object of the invention is to provide a hanger which shall be adjustable as to length so that piping may be hung at any desired level.

Figure 1:
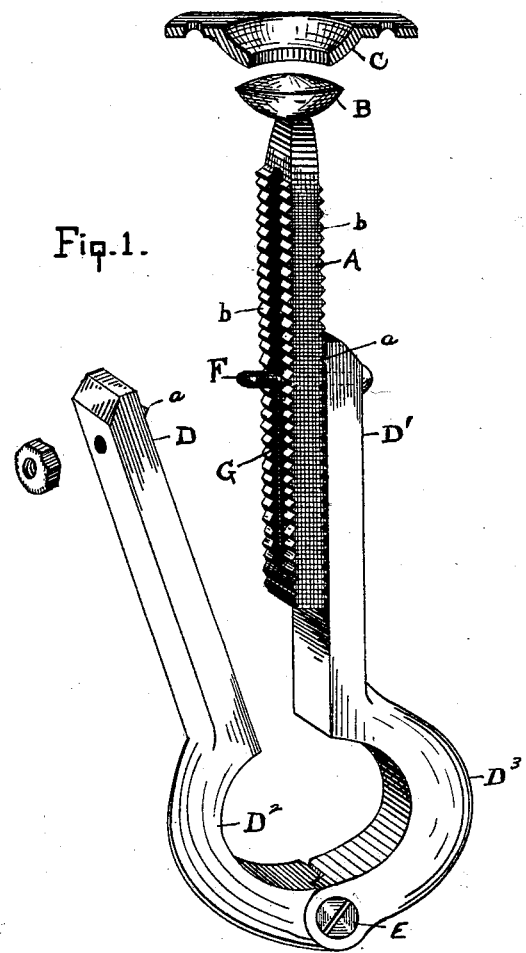
Figure 2:
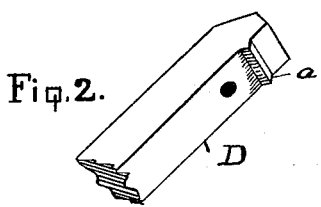

In the drawings forming a part of this application and which are presented herewith, Figure 1 represents a perspective view of the device, showing same partly open, and Fig. 2 is a perspective view of a portion of one arm of the device.

In the figures A represents a bar which is provided with a rounded head B which is designed to hang from a socket-plate C attached to the ceiling or other support, to form a swivel joint.

The pipe-clamp or hanger proper is composed of two arms D and D' having the lower curved portions $D^2$ and $D^3$ respectively, which are hinged together by the aid of a screw or bolt E. Each of the upper extremities of the arms D and D' is provided with a projection or lip $a$ which is designed to engage with a series of notches $b\ b$ formed on one or more sides of the said hanger bar A. In the drawings, the notches are shown on two opposite sides. A bolt F passes through the upper ends of the arms D and D' and also passes through a longitudinal slot G cut through the said bar A at right angles with the sides of the bar having the said notches $b\ b$.

I do not wish to limit myself to the construction described and shown, for the reason that the lips or projections $a\ a$ on the arms D and D' may be made with the bar A, and the notches $b\ b$ on the said bar A may be made in arms D and D' and still other minor changes may be made and still accomplish the same desired results.

The operation and mode of using the device may be understood from the following: The bar A is let down through the socket-plate C, so that the head B rests in the socket and the said plate is then secured to the ceiling or other support. The pipe clamp composed of the arms D and D' is then raised up to the bar A and a bolt passes through the bolt hole in one of the said arms, thence through the slot G of the bar A. The pipe to be supported is then inclosed by the clamp and the free arm of said clamp is carried up to place and the bolt is then passed through the said arm and tightened by the nut provided for the purpose. This operation throws the lips or projections into certain engagement with the notches $b$ of the hanger-bar.

What I claim as new, and desire to secure by Letters Patent, is—

A pipe hanger comprising two clamping arms D D' having their lower extremities curved and hinged together to form an inclosure for a pipe, the upper extremities of said arms D D' inclosing a notched hanger bar having a longitudinal slot G, the said extremities engaging the notches of the said bar by means of the lips $a\ a$ on the inner sides thereof, and a bolt F passing through the said extremities and the said slotted hanger bar for clamping the parts together substantially as set forth.

In testimony whereof I affix my signature in presence of two witnesses.

RANDOLPH BOYD.

Witnesses:
C. H. LYFORD,
E. J. JOHNSTON.